United States Patent [19]

Alcock

[11] Patent Number: 5,389,936
[45] Date of Patent: Feb. 14, 1995

[54] DETERMINING FIX CONFIDENCE SCORES IN DIRECTION FINDING SYSTEMS

[75] Inventor: Robert N. Alcock, Dorking, Great Britain

[73] Assignee: Thorn EMI Electronics Limited, Hayes, England

[21] Appl. No.: 952,747

[22] PCT Filed: May 31, 1991

[86] PCT No.: PCT/GB91/00870
§ 371 Date: Jun. 24, 1993
§ 102(e) Date: Jun. 24, 1993

[87] PCT Pub. No.: WO91/19208
PCT Pub. Date: Dec. 12, 1991

[30] Foreign Application Priority Data

Jun. 1, 1990 [GB] United Kingdom ............... 9012237

[51] Int. Cl.⁶ ............................................. G01S 3/02
[52] U.S. Cl. ....................................... 342/465; 342/450
[58] Field of Search ............... 342/417, 432, 445, 450, 342/463, 465, 451; 364/449

[56] References Cited

U.S. PATENT DOCUMENTS 4,806,936  2/1989  Williams et al. .................. 342/463
5,045,860  9/1991  Hodson ............................ 342/451

Primary Examiner—Gregory C. Issing
Attorney, Agent, or Firm—Keck, Mahin & Cate

[57] ABSTRACT

A method of analysing clusters of bearings (A, B, C, D) taken of distant sources by an array of direction finding stations. Each bearing has an error +E and a triangulation process is used to fix the position of the sources. A combination of bearings is taken one each from the stations. Each bearing of the combination is taken in turn as a spoke (3) directed at a source. The triangulation process generates a bar (31, 32, 33) of intersection points along the spoke for each other bearing of the combination, each bar corresponding to the error +E of each bearing. The number of overlaps between pairs of bars along a spoke is totalled to give a spoke score. The spoke scores of all spokes of the combination is summed to form a fix confidence score for a source which may be associated with the combination, or cluster, of bearings. Methods are also provided for rejecting redundant fixes associated with subsets of bearings within a cluster.

9 Claims, 5 Drawing Sheets

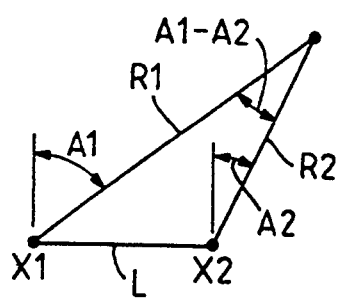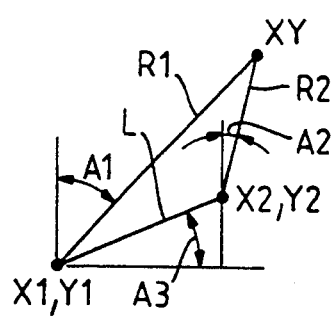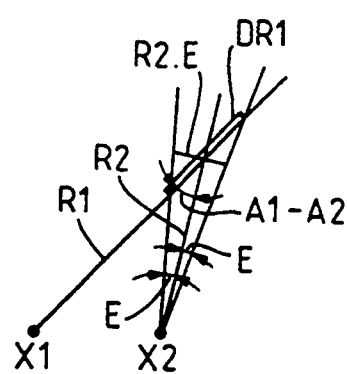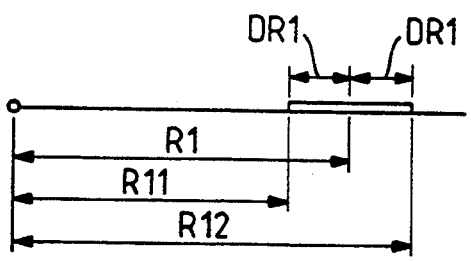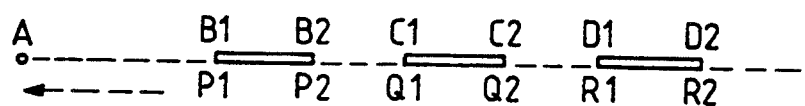

DETERMINING FIX CONFIDENCE SCORES IN DIRECTION FINDING SYSTEMS

TECHNICAL FIELD

This invention relates to a method of, and system for, direction finding, and more particularly to a triangulation processing apparatus for analysing clusters of bearings taken of distant sources by an array of direction finding stations.

BACKGROUND ART

Methods of direction finding include calculating a fix confidence score for each source of radiation detected by direction finding stations in known separated locations, which stations each produce a set of bearings of the sources each detects, each bearing having an error predetermined for the associated station, and a triangulation process being used to fix the position of the sources. Object location by triangulation is well known in civil applications.

The invention may be applied, for example, to the monitoring of ship movements by coastguards. Radars or radios carried by ships may be distinguishable from one another by reason of the differences in source parameters such as frequency of the radar or radio signal, or the modulation characteristics such as pulse length, pulse repetition frequency or even pulse shape. Thus it may be possible to associate a combination of bearings taken one each from the direction finding stations as being from one particular source with a high degree of confidence on the basis of parameter match alone. Also a combination of bearings may appear to converge on one position but there may be no parameter match, in which event the existence of a source at such a position can be discounted.

However, the sources may match in parameter values and be indistinguishable. This is likely in the case of mass produced shipborne radars. In this event the sets of bearings provided by the direction finding stations need to be analysed on a geometrical basis to establish a confidence level for each apparent convergence of a set of bearings on a source. In practice a parameter match confidence level or score will be combined with a geometrical confidence level, or score, to provide an overall confidence level for any apparent source.

DISCLOSURE OF INVENTION

According to one aspect of the present invention there is provided a method of calculating a fix confidence score for each source of radiation detected by direction finding stations in known separated locations, which stations each produce a set of bearings of the sources each detects, each bearing having an error predetermined for the associated station, and a triangulation process being used to fix the position of the sources, characterised in that there are at least three direction finding stations, in that each fix confidence score is formed for a combination of bearings taken one each from the respective stations, in that one bearing of each of the combinations is taken in turn as a spoke directed at a source, in that the triangulation process generates a bar of intersection points along the spoke for each other bearing of the combination, each bar corresponding to the error of each other bearing, in that the number of overlaps between pairs of bars along the spoke is totalled to give a spoke score, and in that the spoke scores for all spokes of the combination are summed to form the fix confidence score for a source which may be associated with the combination.

According to a second aspect of the present invention there is provided a triangulation processing apparatus for use in a direction finding system, the apparatus being characterised by having at least three inputs for connection to respective means for deriving bearing information, which information is subject to error, fix confidence scoring means for forming a fix confidence score for a combination of items of bearing information taken one from each of the inputs, said fix confidence scoring means being configured to treat one item of bearing information of each of the combinations as a spoke directed at a source of radiation and to generate a bar of intersection points along the spoke for each other item of bearing information of the combination, each bar corresponding to the magnitude of the error of each other item of bearing information, the fix confidence scoring means being further configured to total the number of overlaps between pairs of bars along the spoke to give a spoke score and to combine the spoke scores for all the spokes of the combination to form a fix confidence score for a source of radiation which may be associated with the combination.

By means of the direction finding method and triangulation processing apparatus in accordance with the present invention chance intersections of only two bearings taken one each from only two direction finding stations cannot produce any confidence score since there is then only one bar on each spoke and no overlapping bars are possible. Apparent sources at such chance intersections are therefore rejected.

The invention recognizes that in practice all direction finding stations have an associated error in bearing measurement. The error may be a function of the location of the station and may be a function of the bearing magnitude allowing for topographical features such as hills. Also at some locations certain ranges of bearings may not be measurable at all due to local circumstances. In general the sets of bearings produced by the stations will not be equal in number.

The confidence score may be formed for just one bearing from each source, but a fix confidence score may be formed for each of all possible combinations of bearings taken one each from the systems to produce a list of fix confidence scores for possible fixes. The list so formed is exhaustive but will contain a great many redundant scores.

In the event of there being at least four direction finding stations coupled to respective inputs of the triangulation processing apparatus then redundant scores may be reduced, in those cases where in a given combination of bearings each of the spokes has a spoke score greater than zero, by suppressing in the list the fix confidence scores for all the combinations of bearings produced by replacing any one bearing of the given combination by another bearing of the same set as the one replaced. For example with four direction finding stations, if all four spokes of a combination each produce a non-zero score, then any three of them taken together will also produce a non-zero score when taken with any other bearing of the set of the fourth spoke. That is, the fourth spoke does not have to produce any score with the first three spokes for the combination as a whole to produce a non-zero score. But the first three spokes of the combination do not define a new fix. They are merely part of the original four spoke fix. If they turn up in any other combination, they and the score they produce should be deleted from the list as redundant.

An alternative method of reducing redundant scores when there are at least four direction finding stations assumes that in a given combination of bearings when one bearing is ignored and the remaining bearings still produce a fix confidence score greater than zero, that fix confidence score is retained in the list, but the fix confidence scores for all subsequent complete combinations encountered which contain the remaining bearings are suppressed in the list. For example with four direction finding stations, each of all the combinations are examined in turn for a subset of three spokes which, taken alone, produce a non-zero score. These are taken as a fix and the score and associated bearings noted. As the examination proceeds this subset of three spokes may well turn up in a combination in association with another fourth bearing which itself may make no score with triple subset. However, the triple subset confers a non-zero score on the combination as a whole which merely re-identifies the triple subset and should be deleted from the list.

Whether a non-zero fix confidence score is obtained for a particular combination of bearings or not will depend, amongst other things, on the magnitude of the error assumed for each bearing. The error magnitude assumed in the calculation may be altered to produce another fix confidence score or another list of fix confidence scores for comparison with the first score or list of scores. For example, if the errors assumed at all direction finding stations are reduced, the confidence scores will, in the main, be reduced. However if the confidence score for certain fixes remains high, the actual confidence in these fixes is improved. Alternatively, it may be known that one particular direction finding station may be having radiation propagation problems due to atmospheric conditions or to the local terrain. A larger value of bearing error angle E (for this system) may then produce fixes where there may have been suspiciously few when other information is taken into account. Generally, changing the error values may help to resolve difficult situations or may produce more information.

For a given set of assumed error values for the direction finding stations a non-zero score level may be selected below which any apparent fix is rejected as being spurious.

In one embodiment of the present invention the fix confidence scoring means comprises calculating means including means for assigning to each bearing an error predetermined for the associated station, combining means for forming combinations of bearings taken one from each of the stations, analysing means for implementing a triangulation process in which one bearing of each of the combinations is taken as a spoke and a bar is generated for the intersection by each of the other bearings of the combination with the spoke, each bar corresponding to the distance between the lower and upper limits of the error predetermined for the respective station, means for totalling the number of overlaps between pairs of bars along the spoke to give a spoke score, and means for combining the spoke scores for all spokes of the combination are summed to form a fix confidence score.

According to a third aspect of the present invention there is provided a direction finding system comprising at least three direction finding stations disposed at locations the positions of which are known and a triangulation processing apparatus having inputs coupled in use to respective one of the direction finding stations, characterised in that the triangulation processing apparatus is in accordance with the second aspect of the present invention.

BRIEF DESCRIPTION OF DRAWINGS

The present invention will now be described, by way of example, with reference to the accompanying drawings, in which:

FIGS. 6, 7 and 8 illustrate the trigonometrical calculations needed to generate a bar;

FIG. 9 shows a nomenclature used to describe the ends of a bar;

FIG. 10 shows the nomenclature used for bars on a spoke in overlap tests;

BEST MODE FOR CARRYING OUT THE INVENTION

Figure 1:
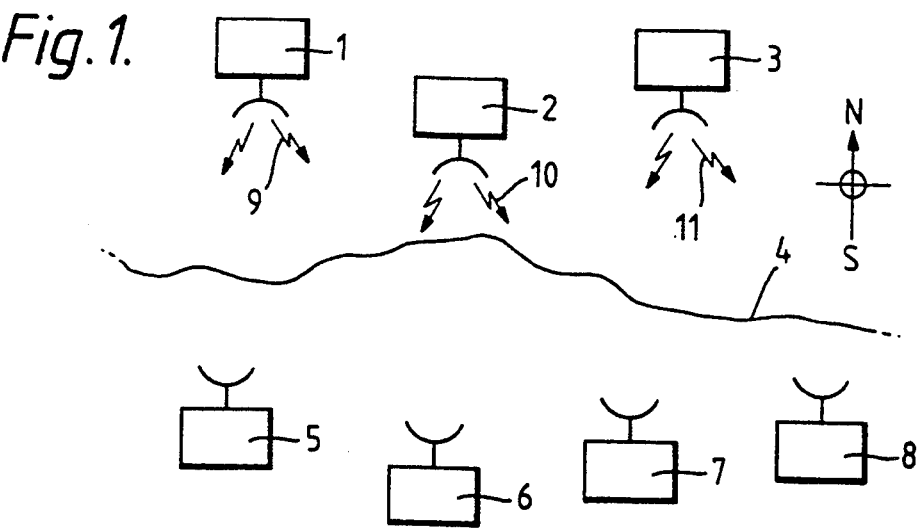
FIG. 1 shows a typical distribution of signal emitters and direction finding stations.

Referring to FIG. 1, three signal emitters 1, 2 and 3, which may for example be radar sets mounted in ships, are shown to the north of a coast 4. They may be emitting radar signals 9, 10, 11 in an attempt to identify the coast or to locate other ships. On the landward side of the coast four direction finding stations 5, 6, 7 and 8 are disposed in separated locations in positions known to the coastguard who desire to locate and identify the ships to control navigations or effect interception in the case of an emergency. The stations 5, 6, 7 and 8, shown schematically, are equipped with means for measuring the bearing from which a signal arrives. The bearing measuring means may comprise arrays of aerials and means for measuring the phase and amplitude of the signals received at each aerial to calculate the bearing. Various such bearing measuring means are known and will not be described further herein since they are not relevant to the understanding of the invention.

Figure 2:
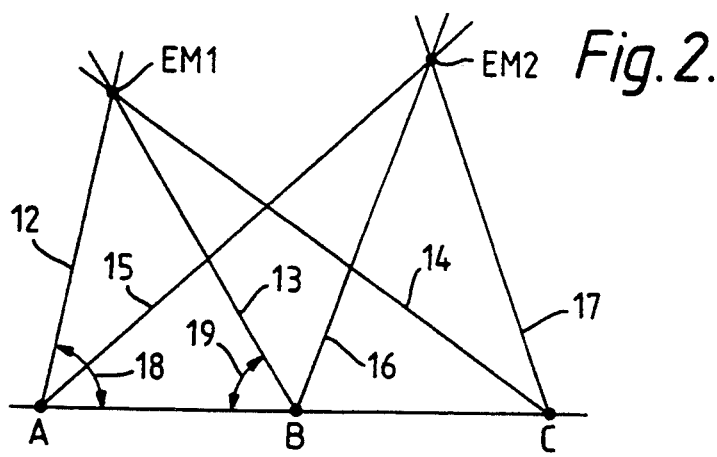
FIG. 2 shows a set of idealised bearings of emitters.

FIG. 2 shows an idealised situation in which there are two emitters EM1 and EM2 and three direction finding stations A, B and C spaced equidistantly along a straight line. The lines (or spokes) 12, 13, 14, 15, 16 and 17 are error free bearings of the emitters derived at the direction finding stations. Apart from any differences in parameters, such as frequency, etc., the emitters are distinguished by a concurrence of three bearing spokes. The concurrence also permits location of the emitters using triangulation to calculate the emitter positions using, for example, the known separation of stations A and B and the angles 18 and 19 subtended at the stations A and B by the emitter EM1.

Figure 3:
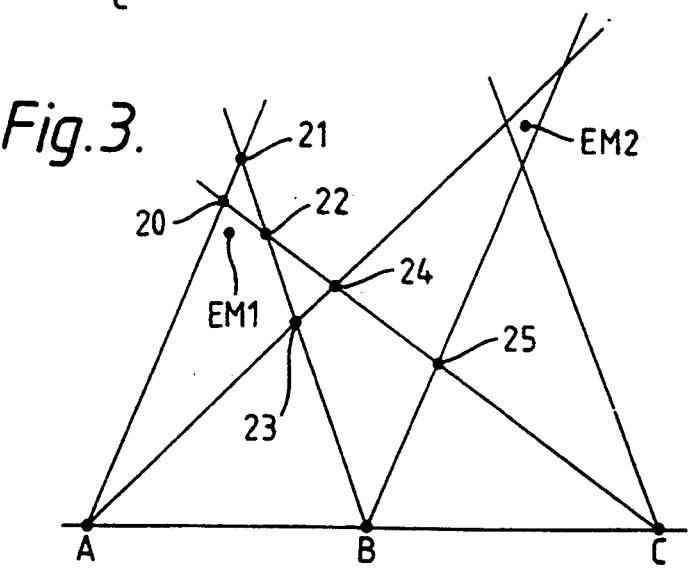
FIG. 3 shows the FIG. 2 situation with bearing errors added.

FIG. 3 shows a more realistic situation where bearing errors have been added. The operator at command is now left with the problems of assessing, for example, whether the three intersections of spokes 20, 21 and 22 are to be associated with the source EM1, what significance is to be attached to the three intersections 22, 23 and 24, and whether any weight should be given to the single intersection 25.

Figure 4:
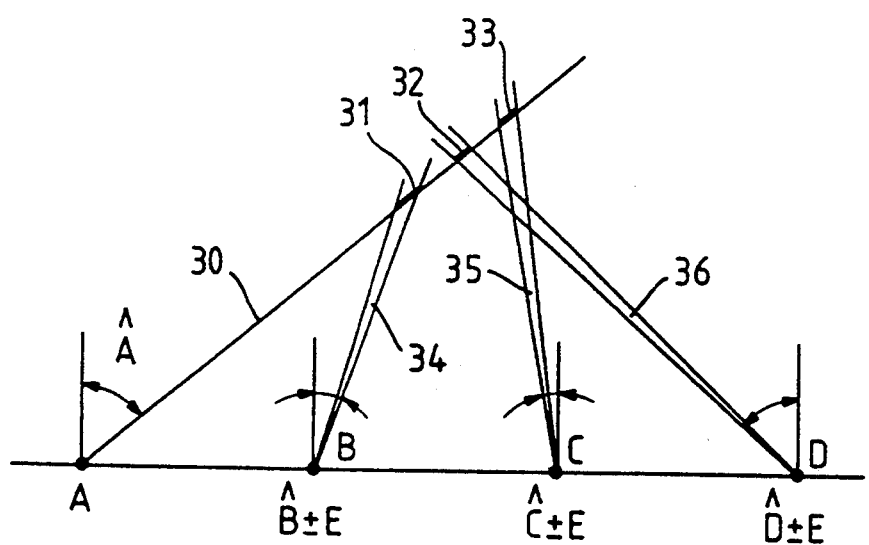
FIG. 4 shows the generation of error bars along a spoke.

FIG. 4 shows the first steps in implementing one embodiment of the method in accordance with the invention. First, there are at least three direction finding stations, in this example four, A, B, C and D. Then a combination of bearings are taken, one each from the four stations and one of them is taken as a spoke directed at a source or emitter, spoke 30 from system A in this example. The triangulation process generates a bar 31 of intersection points along spoke 30 for the bearing B, bar 31 corresponding to the error ±E of the bearing. Likewise bars 32 and 33 are generated for bearings C and D respectively. Then, bearings B, C and D are taken in turn as spokes 34, 35 and 36 respectively and three bars are generated along each of them by the remaining three bearings taken with their errors.

Figure 5:
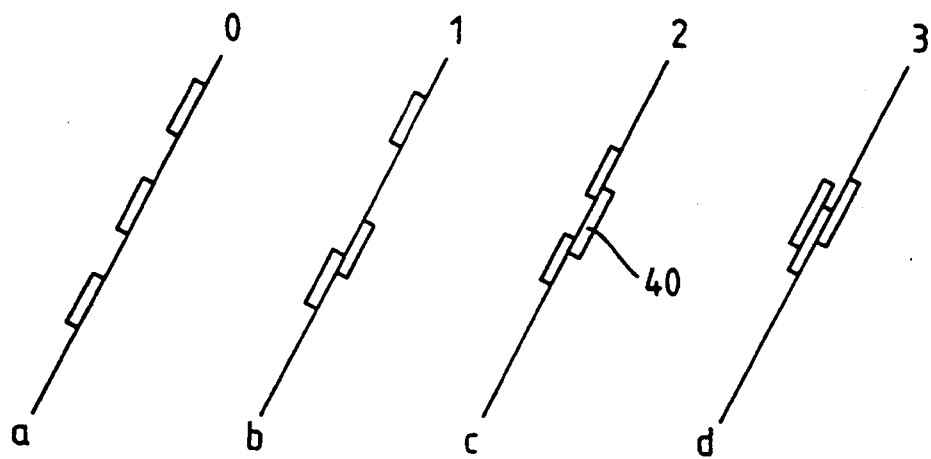
FIG. 5 shows the overlap situations possible for three bars on a spoke.

FIG. 5 shows the possible overlaps that can occur between the bars along a spoke and the assigned scores. The score is made equal to the number of overlapping bars. In (a) the three bars are separate, as they are in FIG. 4, and the overlap score is shown as 0. In (b) two of the bars overlap but the third is separate and the overlap score is 1. Any one of the three bars may be the non-overlapping one and so an overlap score of 1 can arise in three ways. In counting overlaps totals, this is irrelevant but in a computer program written to implement the method, and to be described later, the bars are given distinctive identities. The tests for overlap have to be applied to all combinations of bars in this program. In FIG. 5(c) two overlaps occur. In this case the bridging bar 40 could be any one of three bars and this also is taken into account in the program. In FIG. 5(d) all three bars overlap, the score is three, but this can only occur in one way and one test in the program is sufficient.

The overlap scores for all four spokes of the combination of bearings from stations A, B, C and D are determined in this way and are summed to form the fix confidence score for a source which may be associated with the combination. Thus the maximum fix confidence score is 12 for the FIG. 4 situation, produced by an overlap score of 3 on all four spokes.

FIG. 6 illustrates the trigonometrical calculation needed to calculate the range from a direction finding station to the intersection point of two bearings. The two direction finding stations shown are presumed to lie on the X axis of an arbitrary coordinate system and to have X coordinates X1 and X2. The separation L of the systems is given by $$L = X2 - X1$$

Applying the sine rule to the triangle, $$R1/\sin(90+A2) = R2/\sin(90-A1) = L/\sin(A1-A2),$$

whence $$R1/\cos A2 = R2/\cos A1 = L/\sin(A1-A2)$$

writing SN = sin (A1−A2)

$$R1 = L \cos A2/SN \quad (1)$$

and $$R2 = L \cos A1/SN \quad (2)$$

FIG. 7 illustrates the calculation of ranges for systems having arbitrary X and Y coordinates.

Using the nomenclature of FIG. 7, $$L^2 = (X2-X1)^2 + (Y2-Y1)^2$$

$$A3 = \arctan(Y2-Y1)/(X2-X1)$$

Applying the sine rule as before, the ranges are $$R1 = L \cos(A2+A3)/SN$$

$$R2 = L \cos(A1+A3)/SN$$

With the ranges to the point of intersection known, the position and length of an intersection bar along a spoke can be calculated. Referring to FIG. 8, DR1 is the half length of a bar along a spoke from the first system and is given by $$DR1 = R2.E/SN \quad (3)$$

Similarly DR2, the half length of a bar along a spoke of the second system, is given by $$DR2 = R1.E/SN \quad (4)$$

FIG. 9 gives a nomenclature used to describe the distances of the ends of a bar from a direction finding system.

$$R11 = R1 - DR1, \text{ one end} \quad (5)$$

and $$R12 = R1 + DR1, \text{ the other end.} \quad (6)$$

In the computer program to be described other nomenclatures are used owing to the exigencies of the computer language, BASIC, in which it is written. FIG. 10 shows these nomenclatures and their relationship.

In FIG. 10 it is assumed that the station A is providing the spoke and that stations B, C and D are providing the bars by intersection with spoke A. B1, B2, C1, etc. are bar end descriptors. P1, P2, Q1, etc. are distances from station A to the ends of bars P, Q, etc., and correspond to the ranges R11 and R12 given above.

Overlaps are tested by a comparison of the values of bar end distances from the station A. There now follows a test sequence in chart form in which bar end distances are given any one of the notional integral values 1 to 6 to illustrate the tests made, the descriptor allotted, and the score.

| Bar end distances from A. | | | | | | Bar pairs overlapping (1 = overlap) | | | Overlap pattern Descriptor. | Score |
|---|---|---|---|---|---|---|---|---|---|---|
| P1 | P2 | Q1 | Q2 | R1 | R2 | PQ | QR | PR | U | S |
| 1 | 2 | 3 | 4 | 5 | 6 | 0 | 0 | 0 | 1 | 0 |
| 1 | 3 | 5 | 6 | 2 | 4 | 0 | 0 | 1 | 2 | 1 |
| 1 | 2 | 3 | 5 | 4 | 6 | 0 | 1 | 0 | 3 | 1 |
| 1 | 3 | 2 | 4 | 5 | 6 | 1 | 0 | 0 | 4 | 1 |
| 1 | 3 | 4 | 6 | 2 | 5 | 0 | 1 | 1 | 5 | 2 |
| 1 | 3 | 2 | 5 | 4 | 6 | 1 | 1 | 0 | 6 | 2 |
| 2 | 5 | 1 | 3 | 4 | 6 | 1 | 0 | 1 | 7 | 2 |
| 1 | 4 | 2 | 5 | 3 | 4 | 1 | 1 | 1 | 8 | 3 |

For example, in the 4th row, bar P extends from 1 to 3 and hence overlaps bar Q which extends from 2 to 4. However, bar R (5→6) lies outside bars P and Q. Thus PQ=1 but QR=PR=0. The descriptor U is 4 for this case and distinguishes it from the cases of the 2nd and 3rd rows where also only one overlap occurs and hence the score is 1 in each case.

The logic of the above overlap chart is applied to all four spokes in the FIG. 4 example and the scores achieved by all four spokes totalled to produce the final fix confidence score, which is indicated by a descriptor F in the program, in the same way that U is a descriptor for a single spoke score.

Figure 11:
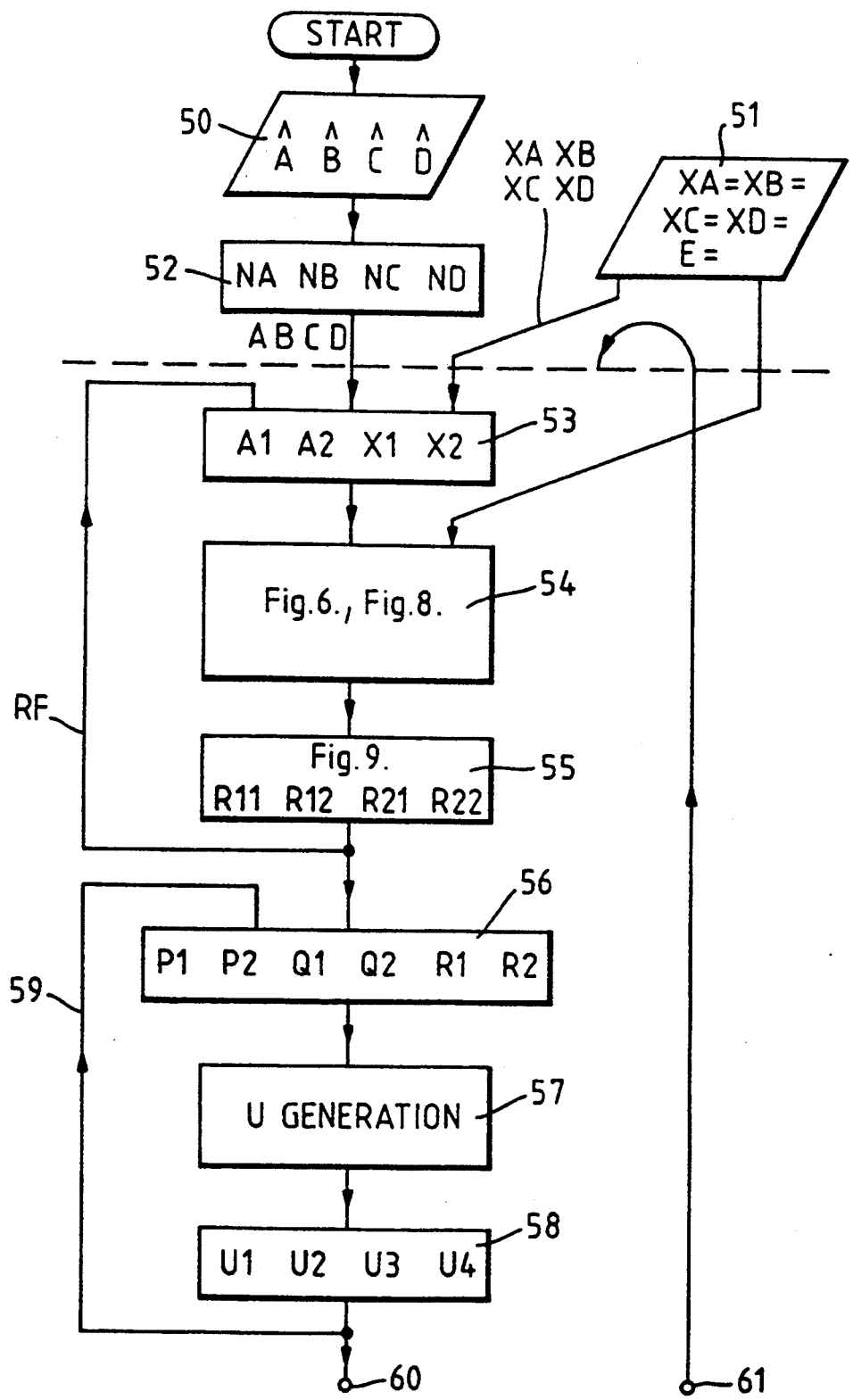
FIG. 11 shows the first part of a computer program flow chart which carries out the fix analysis.
Figure 12:
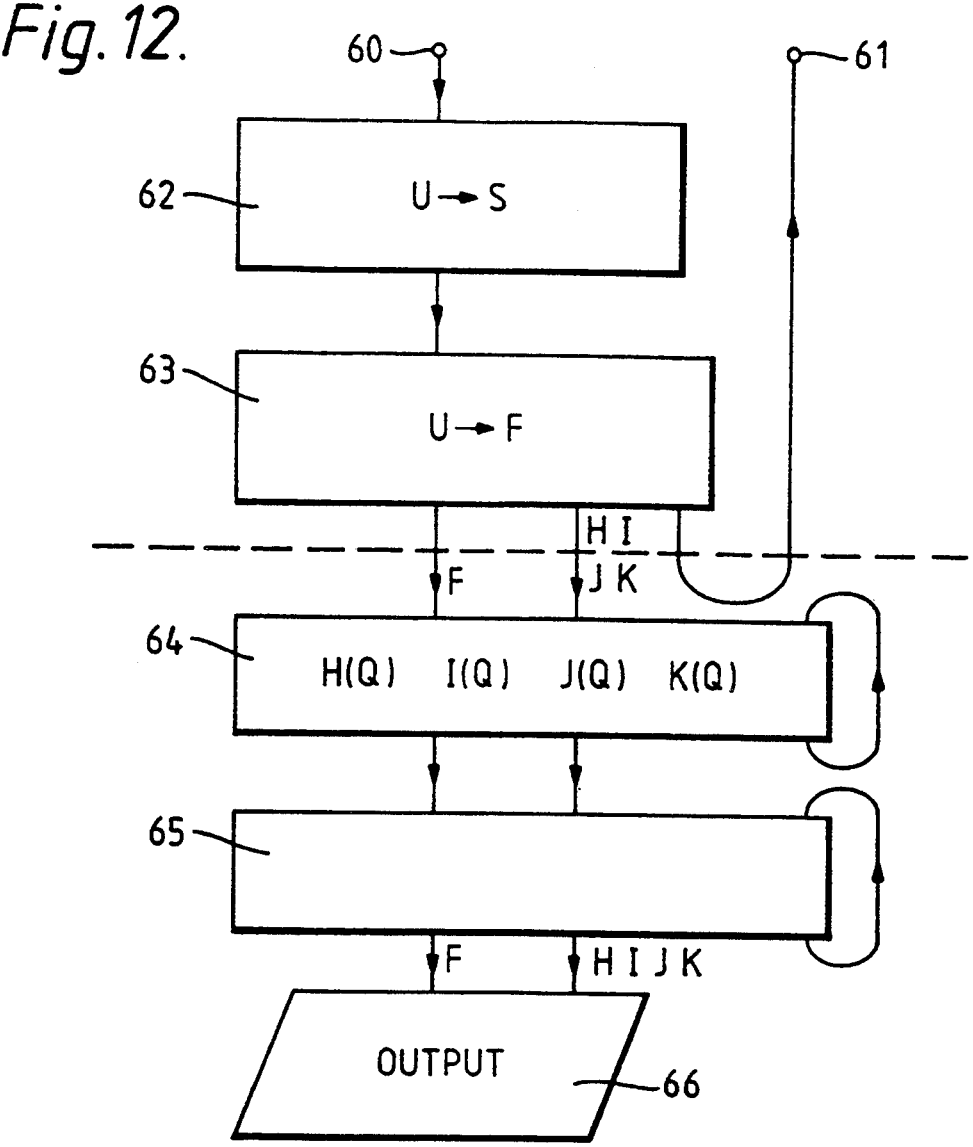
FIG. 12 shows the second part of the flow chart which assigns fix descriptors and makes test for redundant fixes.
Figure 13:
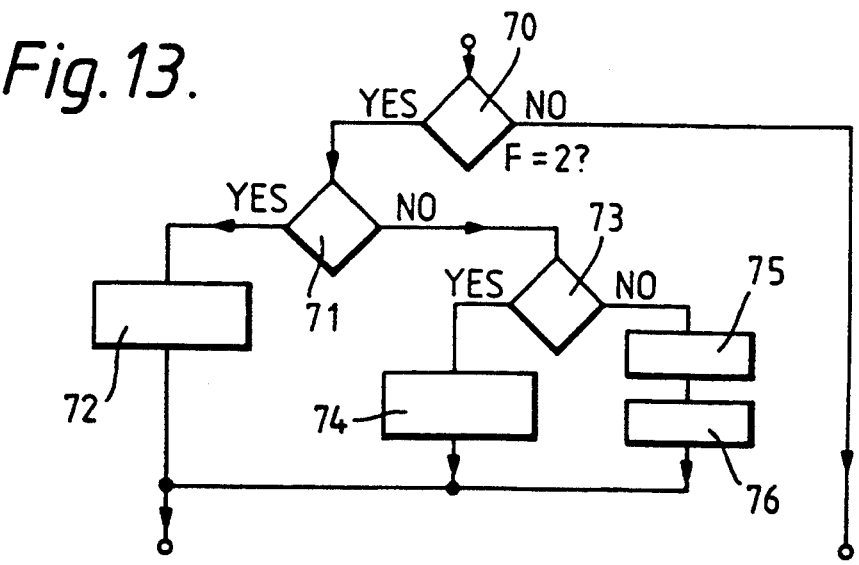
FIG. 13 shows the redundancy tests in more detail.

There now follows a description of the computer program with reference to the flow charts shown in FIGS. 11, 12 and 13.

Referring to FIG. 11 the angles of the bearings obtained by the four direction finding stations A, B, C and D (FIG. 4) are fed into the program at 50. Each station produces a list of bearings, there being NA bearings in the A list, NB in the B list and so on. Later in the program each bearing in a list is assigned an index, indices H(1) to H(NA) for the A list, I(1) to I(NB) for the B list, J(1) to J(NC) for the C list and K(1) to K(ND) for the D list. As the bearings arrive from the direction finding stations they are sorted into the four lists in 52. In this example it is assumed for simplicity that the four stations are colinear and are arranged along the X axis of an arbitrary Cartesian coordinate system. Their positions XA, XB, etc. are fed into the program at 51 together with the bearing error angle E.

In stages 53, 54 and 55 the nomenclature of FIGS. 6, 8 and 9 apply. Thus, in 53 two stations at X1 and X2 are selected together with one angle A1 and A2 at each respectively. In stage 54 the calculations of equations (1), (2), (3) and (4) are performed as illustrated in FIGS. 6 and 8. In stage 55 the calculations of equations 5 and 6 are performed to give the distances of the ends of the two intersecting bars along their spokes from their respective systems, FIG. 9. The program then returns, line RF, to stage 53 to select another pair of angles from the same combination of four angles as A1 and A2 to calculate another pair of bars. This proceeds until all twelve bars, three along each of four spokes, have been calculated for one combination of bearings.

In stage 56 the change from the nomenclature of FIG. 9 to that of FIG. 10 is made and the three bars P, Q and R along any one spoke are assembled for the logic of the overlap chart above to be applied to generate the U descriptor, say U1 for the first spoke. The program then returns, line 59, for another set of three bars along another spoke. Thus in four cycles U1, U2, U3 and U4 are generated for one combination of bearings.

FIG. 12 is a continuation of FIG. 11 at connections 60 and 61. In 62, the descriptor U for each spoke is converted to the spoke score S and in 63 the group of descriptors U1, U2, U3, U4 are converted to the fix descriptor F.

The following chart shows the conversion effected in stage 63 of the program. F descriptors identify particular combinations of spokes.

For example, F=1 if all spokes have a zero score, F=2, 3, 4, or 5 in the case of a triple fix, F=6 for a quadruple fix, F=7 for a triple subset, and finally F=8 for a quadruple subset.

|  | Zero Score | Triple Fixes | | | | Quad Fix |
| --- | --- | --- | --- | --- | --- | --- |
|  |  | ABC | ABD | ACD | BCD | ABCD |
| IF U(1) | =1 and | =4 or | =2 or | =3 or |  | >1 and |
| U(2) | =1 and | =4 or | =2 or |  | =3 or | >1 and |
| U(3) | =1 and | =4 |  | =2 or | =3 or | >1 and |
| U(4) THEN | =1 |  | =4 | =2 | =3 | >1 |
| F= | 1 | 2 | 3 | 4 | 5 | 6 |

Consider for example the row starting with U(1), the descriptor for spoke A. FIG. 10 shows the disposition of bars. For triple fix ABC, assume that the B and C bars overlap causing PQ=1, as shown in the overlap test chart above, and U(1)=4. For triple fix ABD, assume that the B and D bars overlap causing PR=1 and U(1)=2. For triple fix ACD, assume that the C and D bars overlap causing QR=1 and U(1)=3. Triple fix BCD does not involve spoke A and there is no relevant value for U(1). The values for U(2), U(3) and U(4) are derived in a similar way.

The columns are read vertically to derive F. For example, for the ABD combination of spokes:

If U(1)=2 or U(2)=2 or U(4)=4 THEN F=3

The program then returns via 61 to 53 in FIG. 11 to select another combination of bearings and to calculate its fix descriptor. This cycle is repeated NA.NB.NC.ND times so that all combinations of 4 bearings taken one each from the four lists are assigned an F value, each F value being associated with its set of bearing indices H, I, J and K. This is shown input to the next stage 64 where the process of sorting the list of F values to remove redundant information begins.

To illustrate the problems involved in the list sorting, an example of a set of bearings is given below.

| System | A | B | C | D |
| --- | --- | --- | --- | --- |
| Bearings | A(1) | B(1) | C(1) | D(1) |
|  | A(2) | B(2) | C(2) | D(2) |
|  | A(3) | B(3) |  | D(3) |
|  |  | B(4) |  | D(4) |
|  |  |  |  | D(5) |

With this set of bearings, an F value is calculated 3×4×2×5 or 120 times, each with its bearing indices. The redundant information divides into two categories. 1) Quadruple Subsets, or four spoke fixes.

For example, if bearings A(1), B(2), C(2) and D(3) result in a fix with a non-zero score on all four spokes, then there are four sets of bearings which will also result in fixes with scores. First there is the set formed from A(1), B(2), C(2) taken with any of the D bearings other than D(3). Thus there are four bearing combinations in this set. Then, there is the set formed from A(1), B(2), (D3) taken with any C bearing other than C(2), making only one combination in this set. In like manner the sets formed from A(1), C(2), D(3) and B(2), C(2), D(3) have 3 and 2 combinations. All nine of these combinations are redundant since they refer to the same fix as the original four spoke fix. They should all be rejected from the list of F values. Thus the bearing indices of a four spoke fix should be noted when it occurs so that the bearing indices of all subsequent fixes with scores can be compared with them.

2) Triple Subsets.

For example, if bearings A(1), B(2), C(2) on their own result in a fix with a score, then there will apparently be a fix for every combination of bearings which includes these three taken with any D bearing, five combinations in all. Four of these five combinations should be rejected since they are actually a repetition of the first of the five. Thus triplets of bearings must be tested for non-zero scores. As soon as such a triplet arises its bearing indices must be noted and output as a fix. Subsequently, if this combination arises again in combination with any other D bearing, it is rejected.

To deal with these two categories of redundant information, the program detects any four spoke fix and notes the associated bearing indices and it also detects any three spoke fix and notes the associated bearing indices. Stage 64 of the program notes the four spoke fix bearing indices and stage 65 stores further indices and identifies redundant fixes. Output to stage 66 are the F values and bearing indices of non-redundant fixes. The tests carried out in 65 are indicated in more detail in FIG. 13.

Referring to FIG. 13, in box 70 a test is made to find a particular value of F, for example F=2. If YES, then the associated bearing indices are tested in box 71 to see if they are part of a known quadruple subset. If so, they are rejected 72. If not, they are tested in 73 to see if they are part of a known triple subset 74. If not, the indices are noted, 75, as a new triple fix and stored, 76, for use in subsequent tests of other sets of bearing indices.

The examples given have been for a group of four direction finding stations. Clearly four stations are the minimum possible if the above redundancy tests are to be made. However, more than four stations may be used, five, for example, in which case quintuple and quadruple subsets would take the place of quadruple and triple subsets respectively in the above examples.

It should be noted that a non-zero score level for a fix may be selected below which any apparent fix is rejected as being spurious.

From reading the present disclosure, other modifications will be apparent to persons skilled in the art. Such modifications may involve other features which are already known in the design, manufacture and use of direction finding systems and devices and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

Industrial Applicability

The present invention is applicable to direction finding systems.

I claim:

1. A method of determining a fix confidence score for each source of radiation detected by direction finding stations in known separated locations in a direction finding system, which stations each produce a set of bearings of the sources each detects, each bearing having an error predetermined for the associated station, and a triangulation process being used to fix the position of the sources, characterised in that there are at least three direction finding stations, in that each fix confidence score is formed for a combination of bearings taken one each from the respective stations, in that one bearing of each of the combinations is taken in turn as a spoke directed at a source, in that the triangulation process generates a bar of intersection points along the spoke for each other bearing of the combination, each bar corresponding to the error of each other bearing, in that the number of overlaps between pairs of bars along the spoke is totalled to give a spoke score, and in that the spoke scores for all spokes of the combination are summed to form the fix confidence score for a source which may be associated with the combination.

2. Triangulation processing apparatus for use in a direction finding system, the apparatus being characterised by having at least three inputs for connection to respective means for deriving bearing information, which information is subject to error, fix confidence scoring means for forming a fix confidence score for a combination of items of bearing information taken one from each of the inputs, said fix confidence scoring means being configured to treat one item of bearing information of each of the combinations as a spoke directed at a source of radiation and to generate a bar of intersection points along the spoke for each other item of bearing information of the combination, each bar corresponding to the magnitude of the error of each other item of bearing information, the fix confidence scoring means being further configured to total the number of overlaps between pairs of bars along the spoke to give a spoke score and to combine the spoke scores for all the spokes of the combination to form a fix confidence score for a source of radiation which may be associated with the combination.

3. An apparatus as claimed in claim 2, characterised in that the fix confidence scoring means is adapted to produce a fix confidence score for each of all possible combinations of items of bearing information taken one from each of the inputs and to produce a list of fix confidence scores for all possible fixes.

4. An apparatus as claimed in claim 3, characterised in that the apparatus has at least four inputs and in that the fix confidence scoring means is so configured that in a given combination of items of bearing information when one item is ignored and the remaining items still produce a fix confidence score greater than zero, that fix confidence score is retained in the list, but the fix confidence scores for all subsequent complete combinations encountered which contain the remaining items of bearing information are suppressed in the list.

5. An apparatus as claimed in claim 3, characterised in that the apparatus has at least four inputs, and in that the fix confidence scoring means is so configured that if in a given combination of items of bearing information each of the spokes has a spoke score greater than zero, then the fix confidence scores for all the combinations of items of bearing information produced by replacing any one item of the given combination by another item of the same set as the one replaced are suppressed in the list.

6. An apparatus as claimed in claim 5, characterised in that the fix confidence scoring means is configured so that if in a given combination of items of bearing information when one item is ignored and the remaining items still produce a fix confidence score greater than zero, that fix confidence score is retained in the list, but the fix confidence scores for all subsequent complete combinations encountered which contain the remaining bearings are suppressed in the list.

7. An apparatus as claimed in claim 2, characterised in that the triangulation processing means is adapted to select a non-zero score level below which any apparent fix is rejected as being spurious.

8. An apparatus as claimed in claim 2, characterised in that the fix confidence scoring means comprises calculating means including means for assigning to each bearing an error predetermined for the associated station, combining means for forming combinations of bearings taken one from each of the stations, analysing means for implementing a triangulation process in which one bearing of each of the combinations is taken as a spoke and a bar is generated for the intersection by each of the other bearings of the combination with the spoke, each bar corresponding to the distance between the lower and upper limits of the error predetermined for the respective station, means for totalling the number of overlaps between pairs of bars along the spoke to give a spoke score, and means for combining the spoke scores for all spokes of the combination to form a fix confidence score.

9. A direction finding system comprising at least three direction finding stations disposed at locations the positions of which are known and a triangulation processing apparatus having inputs coupled in use to respective ones of the direction finding stations, characterised in that the triangulation processing apparatus includes fix confidence scoring means for forming a fix confidence score for a combination of items of bearing information taken one from each of the inputs, said fix confidence scoring means being configured to treat one item of bearing information of each of the combinations as a spoke directed at a source of radiation and to generate a bar of intersection points along the spoke for each other item of bearing information of the combination, each bar corresponding to the magnitude of the error of each other item of bearing information, the fix confidence scoring means being further configured to total the number of overlaps between pairs of bars along the spoke to give a spoke score and to combine the spoke scores for all the spokes of the combination to form a fix confidence score for a source of radiation which may be associated with the combination.

* * * * *